Jan. 11, 1927.  
O. VOGL  
1,613,858  
MEANS FOR INDICATING THE LENGTHS OF VARIABLE ARTICLES  
Filed June 15, 1925
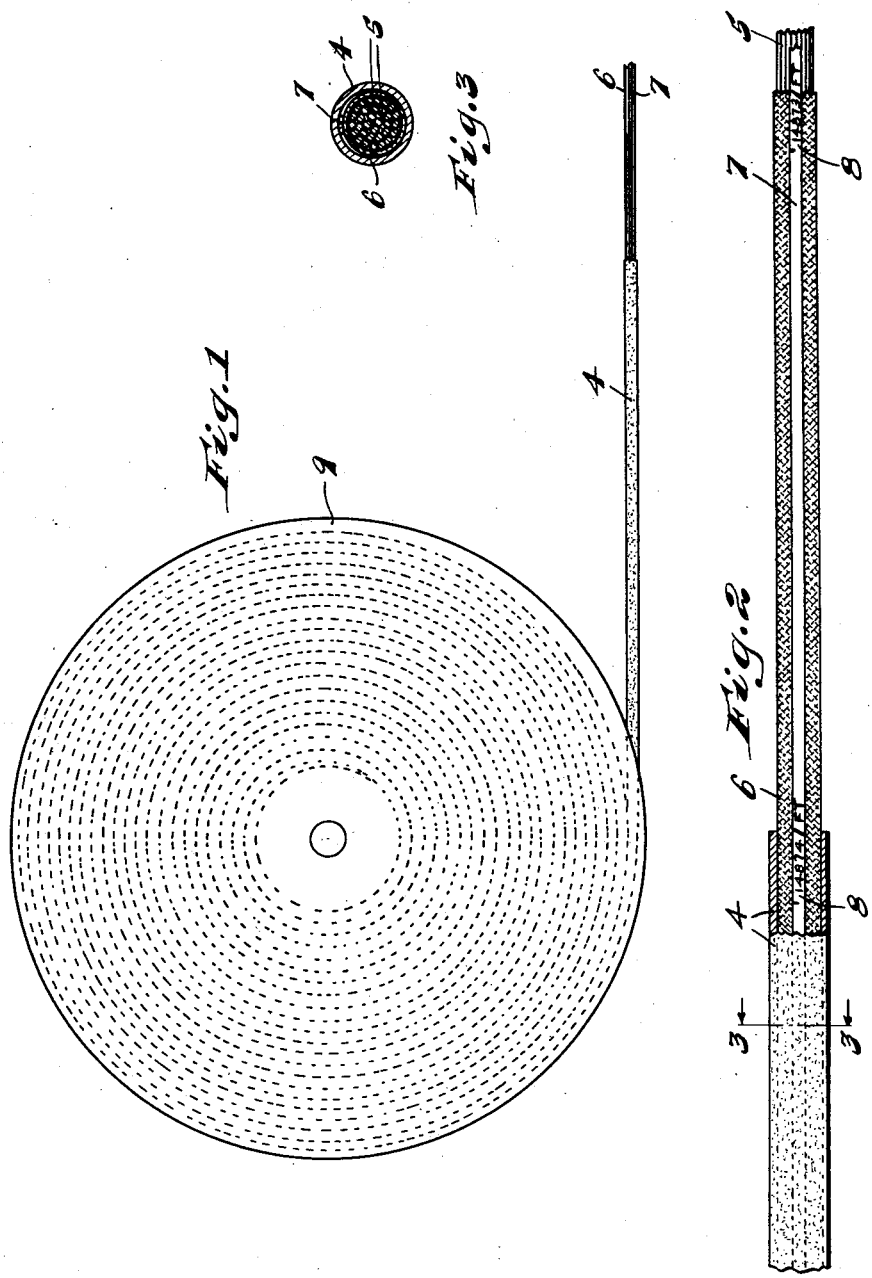
Witnesses:  
C. E. Wesuls.  
B. Y. Richards
Inventor:  
Otto Vogl,  
By Joshua R H Cook  
his Attorney.

Patented Jan. 11, 1927.

1,613,858

UNITED STATES PATENT OFFICE.

OTTO VOGL, OF CHICAGO, ILLINOIS.

MEANS FOR INDICATING THE LENGTHS OF VARIABLE ARTICLES.

Application filed June 15, 1925. Serial No. 37,152.

My invention relates to improvements in means for indicating the lengths of variable articles such as electric cable, fire hose, fly screen, cloth and the like, the object of the invention being to provide means whereby when portions of such material are removed the length of material remaining or the length of the removed portion will be provided with means associated therewith indicating the length thereof.

Other objects will appear hereinafter.

The invention consists in the combinations and arrangements of parts hereinafter described and claimed.

The invention will be best understood by reference to the accompanying drawing, forming a part of this specification, and in which, Fig. 1 is a side view of a spool or reel containing electric cable provided with marking means embodying the invention;

Fig. 2 is an enlarged longitudinal view shown partially in section of a portion of said cable; and Fig. 3 is an enlarged view taken on line 3—3 of Fig. 2.

The specific application of the invention illustrated in the drawing comprises an ordinary flexible electric cable having an outer covering or sheath of lead pipe or tube 4, a central core of copper wires 5 and a covering 6 of insulating material such as rubber composition interposed between the central core 5 and the lead sheath 4, such construction being the ordinary usual heavy electric cable. Arranged in said cable between the rubber covering 6 and the lead sheath 4 is a strip of tape 7 extending the full length of the cable and in substance and effect constituting a part thereof. The tape 7 is provided with scale-markings 8 indicating its length in feet, said scale, of course, also indicating the length of the cable into which the tape is bound, thereby serving as a convenient means of determining output in the manufacture or as a check on measuring of output. The cable is shown as rolled or coiled upon the usual spool or reel 9.

By this arrangement when a portion of the cable is removed and severed from the remainder, the enclosed tape 7 will be severed therewith and all that is necessary to determine the length of the severed cable is to uncover sufficient of the ends of the tape 7 to read the markings thereon, the difference between said markings being the length of cable severed. Likewise the remnant end of the tape 7 indicates the length of cable still remaining on the spool or reel without the necessity of measuring the same. For convenience in determining the remnant of cable still on the reel, the reel should be marked with the scale on the inner end of the tape if the tape marking does not commence with zero. Then by subtracting the marking at the inner end of the tape from the marking at the severed end of the tape, the length of the remnant still on the reel may be obtained.

Obviously, the same arrangement and method may be employed in conjunction with any elongated strip of severable material such as fire hose, fly screen, cloth or the like with the same results.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a variable strip of severable material consisting of an inner body and an outer sheath therefor, of a marking strip enclosed in and protected by said sheath, said marking strip being marked to indicate the corresponding lengths of said material, substantially as desired.

2. The combination with an electric cable consisting of an inner body enclosed by a protective sheath, of a tape arranged on said body and enclosed and protected by said sheath, said tape being marked to indicate the lengths of the various portions thereof, substantially as described.

In testimony whereof I have signed my name to this specification.

OTTO VOGL.